United States Patent [19]

McCaslin

[11] Patent Number: 5,136,531
[45] Date of Patent: Aug. 4, 1992

[54] METHOD AND APPARATUS FOR DETECTING A WIDEBAND TONE

[75] Inventor: Shawn McCaslin, Cedar Creek, Tex.

[73] Assignee: Motorola, Inc., Schaumburg, Ill.

[21] Appl. No.: 740,235

[22] Filed: Aug. 5, 1991

[51] Int. Cl.$^5$ .............................................. G06F 15/31
[52] U.S. Cl. ........................... 364/724.09; 364/724.19
[58] Field of Search ...................... 364/724.08, 724.09, 364/724.19

[56] References Cited

U.S. PATENT DOCUMENTS

| | | | |
|---|---|---|---|
| 4,791,390 | 12/1988 | Harris et al. ............... | 364/724.19 X |
| 4,989,170 | 1/1991 | Batruni et al. ................. | 364/724.19 |
| 5,058,047 | 10/1991 | Chung ........................... | 364/724.19 |

OTHER PUBLICATIONS

Feintuch, "An Adaptive Recursive LMS Filter", Proc. of the IEEE, Nov. 1976, pp. 1622–1624.
Thompson, "A Constrained Recursive Adaptive Filter for Enhancement of Narrowband Signals in White Noise", Conference: Conference Record of the Twelfth Asilomar Conference on Circuits, Systems and Computers, Pacific Grove, Calif., USA (Nov. 6–8, 1978).
Hush, et al., "An Adaptive IIR Structure for Sinusoidal Enhancement, Frequency Estimation, and Detection", vol. 34/No.6 IEEE Transactions on Acoustics, Speech, and Signal Processing, Dec. 1986, pp. 1380–1389.

*Primary Examiner*—Tan V. Mai
*Attorney, Agent, or Firm*—Paul J. Polansky

[57] ABSTRACT

A method of detecting a wideband tone, having a nominal frequency but occurring anywhere within a wide range of frequencies, includes a step of bandpass filtering input data. The bandpass-filtered data is used to predict a value of the input data using an algorithm such as least-mean-squares (LMS) adaptive linear prediction. An error signal is provided as a difference between the actual and predicted values of the input data. By computing the power in the error signal, the presence or absence of a tone can be detected, because a tone causes a smaller prediction error and power than other, non-tone processes such as white noise. A high-to-low transition in power represents a start of a tone, whereas a low-to-high transition in power represents an end of a tone. A tone flag signal is provided in response to a predetermined relationship between two power computations, such as a low-to-high transition.

19 Claims, 3 Drawing Sheets

METHOD AND APPARATUS FOR DETECTING A WIDEBAND TONE

FIELD OF THE INVENTION

This invention relates generally to signal processing methods, and more particularly, to wideband tone detection methods.

BACKGROUND OF THE INVENTION

In applications such as telecommunications it is often necessary to detect certain special signals which may be present in the telecommunication signal stream. For example, in the DTMF telephone system, it is necessary to detect two tones to decode a key pressed on a telephone keypad. In the DTMF system, a tone detector must detect the presence of two of several possible tones to decode one of twelve telephone keys. The tone detector must reliably discriminate between tones and such sounds as the human voice and background noise. In the DTMF system, the frequencies at which the predetermined tones are expected are known with little uncertainty, making tone detection easier.

A tone is a sinusoidal wave at a specific frequency. One method of tone detection used in DTMF systems is to pass the input signal through a narrow-bandwidth bandpass filter, and then to measure the power in the bandpass-filtered signal. If a tone is present in the input signal, a high power level will be measured in the bandpass-filtered signal. The tone is detected by comparing the power in the bandpass-filtered signal with the power in another band of frequencies. This other band of frequencies is selected to exclude any possible tone frequency, such as the second harmonic of the highest expected tone frequency. If the power in the first bandpass-filtered signal exceeds the power in the other passband of frequencies by a predetermined threshold, then a tone is detected. If no tone is present, then the power measured in the bandpass-filtered signal will not exceed the power in the other band by the threshold. A change in the power ratio can also be used to determine the time at which the tone started or ended. A false-to-true transition in the power-ratio decision signifies a leading edge of the tone; a true-to-false transition in the power-ratio decision signifies a trailing edge of the tone.

However in other applications, a tone is expected at a frequency anywhere within a wide range. If the bandwidth of the bandpass filter is made wide enough to include any possible frequency for the tone, then significant amounts of other components such as white noise are also included, and the power-ratio decision may falsely indicate a tone when only white noise is present. Thus, the technique acceptable for the DTMF system described above fails to work properly for wideband tone detection, and different methods of tone detection must be employed.

SUMMARY OF THE INVENTION

Accordingly, there is provided, in one form, a method of detecting a wideband tone comprising the steps of bandpass filtering input data; providing an error signal as a difference between the input data and a value of the input data predicted from the bandpass filtered data; continuously computing a power of the error signal; and providing a tone flag signal in response to a predetermined relationship between a first power computed during a first interval in time and a second power computed during a second interval in time. In another form, the method of detecting a wideband tone comprises a step of providing the error signal as the difference between the input data and the value of the input data predicted from the bandpass-filtered data using a least-mean-squares (LMS) adaptive linear prediction.

These and other features and advantages will be more clearly understood from the following detailed description taken in conjunction with the accompanying drawings.

DETAILED DESCRIPTION OF THE INVENTION

Figure 1:
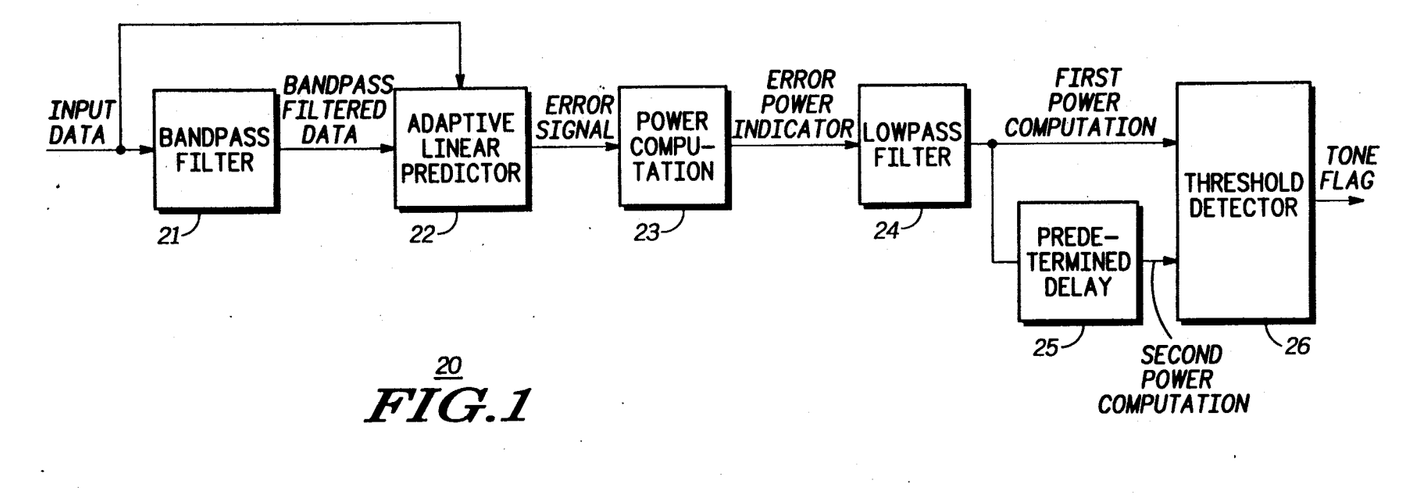
FIG. 1 illustrates in block diagram form a wideband tone detector in accordance with the present invention.

FIG. 1 illustrates in block diagram form a wideband tone detector 20 in accordance with the present invention. Tone detector 20 includes a bandpass filter 21, an adaptive linear predictor 22, a power computation 23, a lowpass filter 24, a predetermined delay 25, and a threshold detector 26. In general, the operation of tone detector 20 can be described in terms of normalized Hz. Nyquist's theorem provides that to preserve information in a sampled system, the digital sampling rate of a signal must be at least twice the highest expected frequency. Thus, the sampling frequency may be designated as 1 normalized Hz. A frequency of 0 normalized Hz represents a direct current (DC) offset in the signal. From Nyquist's theorem, the highest expected frequency should be at 0.5 normalized Hz. The center frequency of the expected range of frequencies is thus at 0.25 normalized Hz.

Bandpass filter 21 receives a group of signals known as "INPUT DATA". INPUT DATA is a digital representation of an analog signal stream, which may be quantized to, for example, 8 bits. In the illustrated embodiment, the expected range of frequencies occurs between 0.125 and 0.375 normalized Hz, which is chosen to be the bandwidth of bandpass filter 21. Thus, the output of bandpass filter 21, labelled "BANDPASS FILTERED DATA", is an 8-bit digital signal with a frequency of 1 normalized Hz, but having only those signal components with frequencies between 0.125 and 0.375 normalized Hz. While Nyquist's theorem allows sampling of signal components from 0 to 0.5 normalized Hz, the ability to further restrict the bandwidth of bandpass filter 21 provides important advantages. First, bandpass filter 21 is able to reject any white noise in the ranges 0–0.125 and 0.375–1.0 normalized Hz, improving the prediction ability of tone detector 20. Second, since the passband excludes frequencies below 0.125 Hz, any DC offset is rejected. Third, any other spectrally-concentrated noise which may provide a false tone detect, lying within the range from 0 to 0.125 and 0.375 to 0.5 normalized Hz is rejected. Simply applying a fixed bandpass filter to the signal before receiving INPUT DATA, however, would likely cause false detects, because white noise can look spectrally concentrated over short periods of time. Thus, the placement of bandpass filter 21 between INPUT DATA and the input of adaptive linear predictor 22 prevents false detection of a tone due to short-duration changes in signal statistics such as noise resembling a tone.

Adaptive linear predictor 22 receives the 8-bit BANDPASS FILTERED DATA and provides "ERROR SIGNAL" as a difference between the INPUT DATA and a predicted value of the BANDPASS FILTERED DATA. Adaptive linear predictor 22 is a fast impulse response (FIR) predictor using a least-mean-squares (LMS) prediction algorithm to calculate the error signal. LMS techniques are known in the art and have been used in tone detectors. See, for example, Hush, et al., "An Adaptive IIR Structure for Sinusoidal Enhancement, Frequency Estimation, and Detection," vol. 34, no. 6, *IEEE Transactions on Acoustics, Speech, and Signal Processing*, December 1986, pp. 1380–1389. However, an infinite impulse response (IIR) predictor would also suffice for adaptive linear predictor 22. The LMS technique predicts future values of the BANDPASS FILTERED DATA. Certain autoregressive signal processes, such as tones which can be represented as sine waves, are easy to predict, and thus adaptive linear predictor 22 provides only small values of ERROR SIGNAL when a tone is present in the BANDPASS FILTERED DATA. Broadband processes, such as white noise, are difficult to predict, and the LMS technique produces large errors; thus adaptive linear predictor 22 provides large values of ERROR SIGNAL when no tone is present in BANDPASS FILTERED DATA. By observing the prediction errors, it is possible to distinguish between tones and other broadband processes such as white noise. Thus, a transition from a large prediction error to a small prediction error indicates the start of a tone, and a transition from a small prediction error to a large prediction error indicates the end of a tone.

Power computation 23 provides a power estimate of ERROR SIGNAL. It is necessary to calculate the power of ERROR SIGNAL, instead of just the magnitude, because ERROR SIGNAL may be both positive or negative. Power computation 23 provides an estimate of power, labelled "ERROR POWER INDICATOR", by squaring the value of (or taking the absolute value of) ERROR SIGNAL. Lowpass filter 24 then averages the power measurement over multiple sample periods. In the illustrated embodiment, lowpass filter 24 averages ERROR POWER INDICATOR over four sample periods, to provide an average power labelled "FIRST POWER COMPUTATION". FIRST POWER COMPUTATION is thus a moving average of four sample periods. Predetermined delay 25 then provides a "SECOND POWER COMPUTATION" delayed by six sample periods from FIRST POWER COMPUTATION. Thus FIRST POWER COMPUTATION is later in time than SECOND POWER COMPUTATION. Threshold detector 26 then examines the difference between the two power computations to determine the occurrence of a tone. As indicated earlier, a high power-to-low power transition represents the start of a tone, and a low power-to-high power transition represents the end of the tone. Thus, tone detector 20 has the advantage that either transition may be detected. However, the transition that occurs at the end of the tone is easier to detect, and detection of this transition is preferred. Furthermore, in some applications, the tone has a predetermined duration, and thus and end-of-tone detection allows determination of the start of the tone.

In the illustrated embodiment, the critical point is the end of the tone; thus, threshold detector looks for a low-to-high transition from SECOND POWER COMPUTATION to FIRST POWER COMPUTATION. A threshold is incorporated into the determination by multiplying the later power measurement FIRST POWER COMPUTATION by a predetermined constant. In the illustrated embodiment, the constant is chosen to be 0.5; thus, FIRST POWER COMPUTATION must be at least twice as large as SECOND POWER COMPUTATION in order to detect the end of a tone. When the end of a tone is detected, threshold detector 26 sets a signal labelled "TONE FLAG", which has a value of binary one when an end of tone is detected, and a value of binary zero otherwise.

Figure 2:
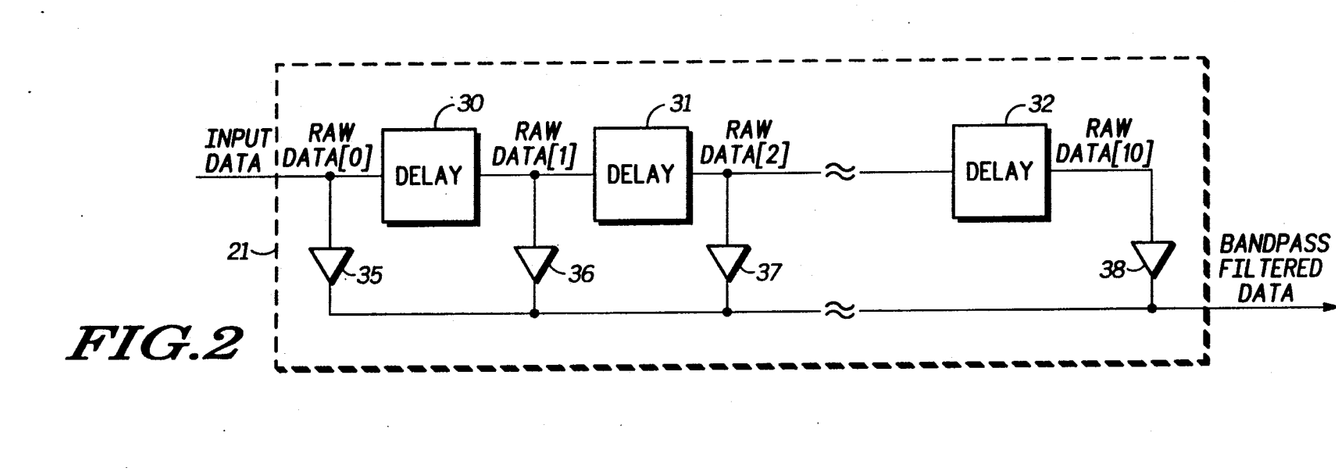
FIG. 2 illustrates in block diagram form the bandpass filter of the wideband tone detector of FIG. 1.

FIG. 2 illustrates in block diagram form bandpass filter 21 of wideband tone detector 20 of FIG. 1. Bandpass filter 20 is a conventional digital bandpass filter, known as an FIR filter, which includes a plurality of delay elements and a plurality of fixed-constant multipliers. In the illustrated embodiment, bandpass filter 21 includes ten delay elements and eleven fixed-constant multipliers. Illustrated in FIG. 2 are representative delay elements 30, 31, and 32, and representative fixed-constant multipliers 35, 36, 37, and 38. Delay element 30 receives the 8-bit INPUT DATA, which is also referred to as "RAW DATA[0]", and delays it by one sampling period to provide "RAW DATA[1]". Similarly, delay elements 31, 32, and delay elements not shown delay the previous data by one sampling period. There are thus eleven nodes providing an array of signals labelled "RAW DATA[i]", where i is from 0 to 11. Each fixed-constant multiplier has an input coupled to a corresponding RAW DATA[i] signal, and has an output. For example, fixed-constant multiplier 35 has an input for receiving RAW DATA[0], and an output. The outputs of all fixed-constant multipliers are summed together to provide BANDPASS FILTERED DATA. Thus, the outputs of the delay elements collectively form a history of the 8-bit INPUT DATA.

Figure 3:
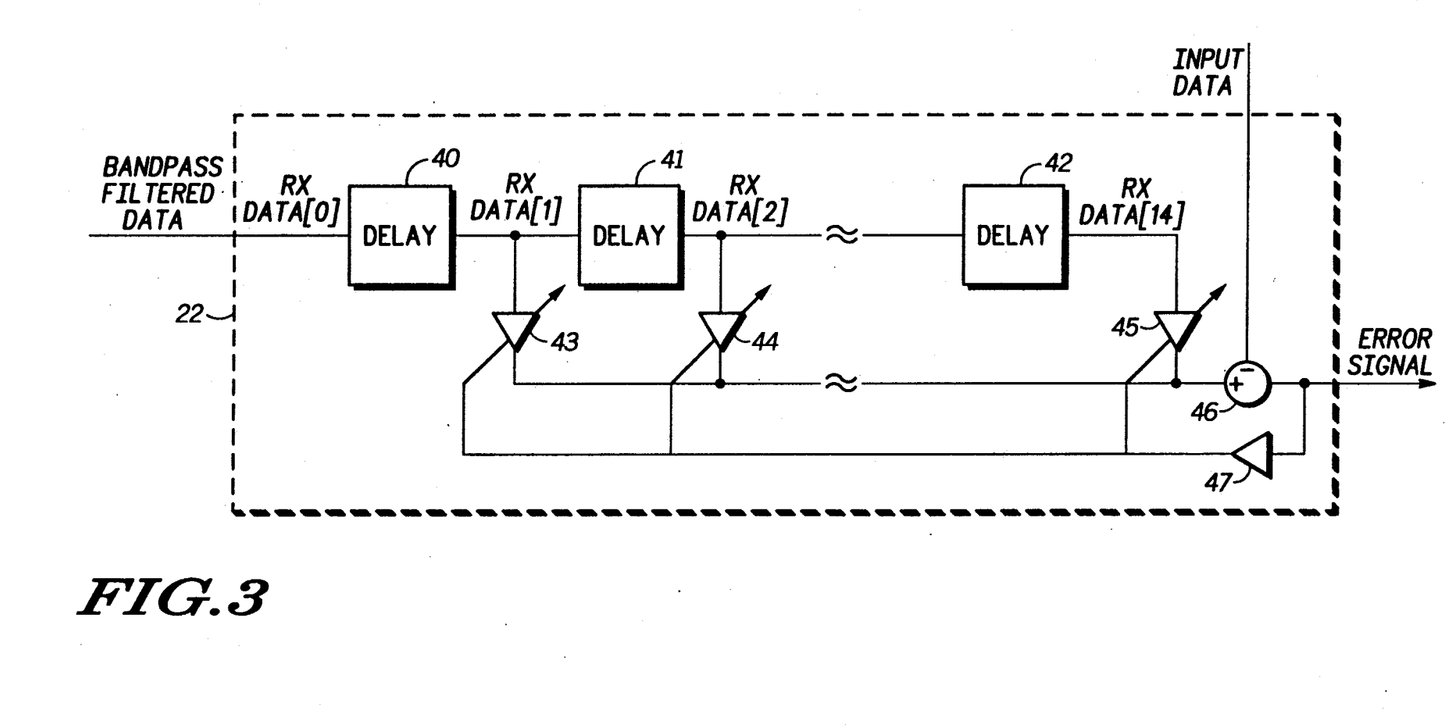
FIG. 3 illustrates in block diagram form the adaptive linear predictor of the wideband tone detector of FIG. 1.

FIG. 3 illustrates in block diagram form adaptive linear predictor 22 of wideband tone detector 20 of FIG. 1. Adaptive linear predictor 22 is a conventional LMS predictor which includes a plurality of delay elements, a plurality of variable multipliers, a subtractor 46, and a fixed-constant multiplier 47. In the illustrated embodiment, adaptive linear predictor 22 includes fourteen delay elements and fourteen variable multipliers; illustrated in FIG. 3 are representative delay elements 40, 41, and 42 and representative variable multipliers 43, 44, and 45. Delay element 40 receives BANDPASS FILTERED DATA, also known as "RX DATA[0]", and delays it by one sampling period to provide "RX DATA[1]". Each subsequent delay element has an input coupled to the previous delay element's output. There are thus fifteen nodes providing an array of signals labelled "RX DATA[j]", where j is from 0 to 14. Each variable multiplier has an input coupled to a corresponding RX DATA[j] signal, and has an output. For example, variable multiplier 43 has an input for receiving RX DATA[1], and an output. The outputs of all variable multipliers are summed together to form an estimated signal, which is provided as a positive input to subtractor 46. INPUT DATA provides a negative input to subtractor 46. Thus ERROR SIGNAL, the output of subtractor 46, is provided as a difference between an estimated value for INPUT DATA, and the value of INPUT DATA itself. If adaptive linear predictor 22 provides a good estimate of the value of INPUT DATA, such as in the presence of a tone, then ERROR SIGNAL will be small. Otherwise, such as in the presence of white noise, ERROR SIGNAL will be large. Fixed-constant multiplier 47 receives ERROR SIGNAL as an input, and multiplies ERROR SIGNAL by a fixed constant known as the adaptation coefficient $\beta$. Thus, the weights of the variable multipliers are equal to $(\beta)$(ERROR SIGNAL). A smaller value of $\beta$ improves the prediction accuracy of adaptive linear predictor 22, whereas a larger value of $\beta$ improves the speed of adaptation. Thus a choice of an optimal $\beta$ involves a tradeoff of these conflicting performance goals.

Referring again to FIG. 1, it should be noted that in the preferred embodiment, tone detector 20 is performed by software, known as microcode, running on a data processor. APPENDIX A illustrates a portion of a computer softward listing implementing the wideband tone detector of FIG. 1. The software of APPENDIX A is written in the C programming language. Note that all type definitions, constant values, and calls to the illustrated software portion from a main program are omitted. TABLE I further elucidates the meaning of some of the variables, functions, and function calls helpful in understanding the software listing. TABLE I also provides a correspondence between function calls and the elements of FIG. 1 is also provided. In other embodiments some or all of tone detector 20 may be performed by dedicated electronic circuitry. Thus it should be apparent that the invention illustrated by tone detector 20 encompasses different implementations of the functions of the elements of FIG. 1.

The software of APPENDIX A performs an additional signal processing function not illustrated by FIG. 1. A discriminator is applied to the input signal to detect a sudden increase in the level of white noise; when such a condition is detected, TONE FLAG is inhibited. This broadband white-noise discriminator and other signal discriminators may be applied to improve the accuracy of tone detector 20. However such discriminators vary from implementation to implementation depending on the implementation's particular signal characteristics.

TABLE I

| Term | Meaning |
| --- | --- |
| errsig | function performed by adaptive linear predictor 22 and providing ERROR SIGNAL |
| dotm | generic function performing a convolution of a first two parameters passed |
| rx_data | RX_DATA array starting address |
| atap | array of adaptive filter coefficients |
| ntaps | the number of elements in RX_DATA, fourteen in the illustrated embodiment |
| x | the immediately-received sample of INPUT DATA, equivalent to RAW_DATA[0] |
| epia | ERROR POWER INDICATOR |
| sample_counter | a free-running time stamp which is used to indicate the current time measured in sample periods |
| power_window | a constant which allows tone detection only once in power_window sampling periods |
| beta | the adaptive coefficient $\beta$ |
| nrxdata | the size of the rx_data array |
| raw_data | RAW_DATA array starting address |
| prefilter | prefilter array starting address |
| prefilter_length | prefilter array length |
| powera through powerj | power computations of ERROR SIGNAL; FIRST POWER COMPUTATION = (powerg + powerh + poweri + powerj); |

TABLE I-continued

| Term | Meaning |
| --- | --- |
| | SECOND POWER COMPUTATION = (powera + powerb + powerc + powerd) |
| raw_powera through raw_powerl | computation of the power in the input signal, used for a broadband noise increase discriminator |
| detect_scale_factor | threshold factor for detecting a power transition |
| blocked | noise discriminator variable inhibiting tone detection |
| tone_persist_counter | a counter which requires counts consecutive end-of-tone detections before signalling an overall tone detect |
| tone_persist_count | a constant signifying the size of tone_detect_counter before an overall tone detection, three in the illustrated embodiment |

Figure 4:
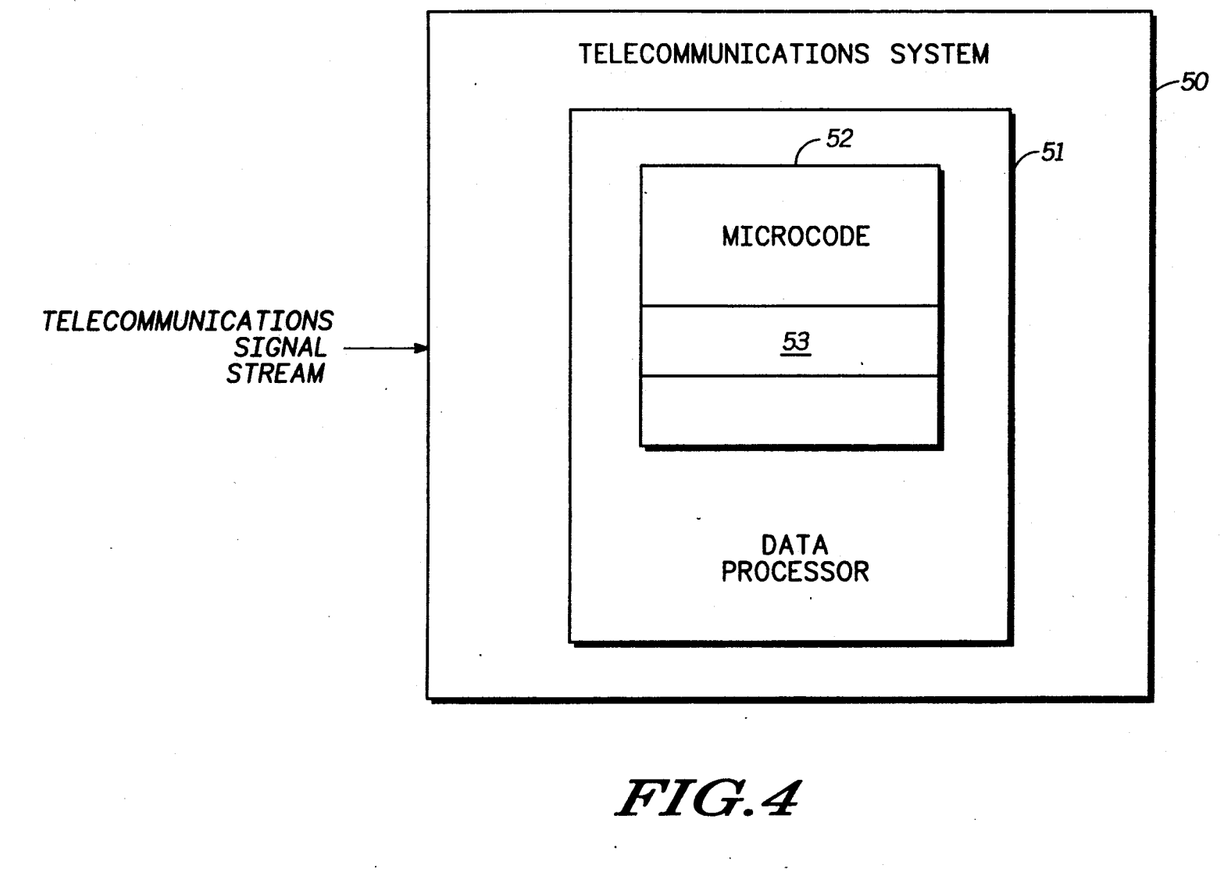
FIG. 4 illustrates in block diagram form a data processor in accordance with the preferred embodiment of the present invention.

FIG. 4 illustrates in block diagram form a telecommunications system 50 in accordance with the preferred embodiment of the present invention. Telecommunications system 50 includes a data processor 51, microcode 52, and a microcode portion 53. Telecommunications system 50 receives a telecommunications signal stream. Data processor 51 performs the function of tone detector 20 of FIG. 1 by running instructions stored in portion 53, as part of its microcode 52 to detect when a wideband tone is received by telecommunications system 50. Source code corresponding to instructions in portion 53 is illustrated in Appendix A.

It should be apparent by now that a method for detecting a wideband tone for such applications as detecting the end of a tone has been described. This method detects a wideband tone without the need for a reference frequency, which is required for known wideband tone detectors such as that disclosed by Hush et al., referenced earlier. Another alternative approach which doesn't require a reference is to threshold the discrete fourier transform (DFT) of the predictor coefficients. An advantage of the present tone detection method is that it doesn't require the computation-intensive determination of the DFT. The tone detector first bandpass-filters the incoming data stream. Next, the bandpass-filtered data is provided to an adaptive linear predictor, which predicts the next received value of the data stream. The prediction error will be small in the presence of certain autoregressive processes such as sine-wave tones. The power in the error signal is computed, and then averaged. A high-to-low transition in the power computation represents the start of a tone, whereas a low-to-high transition represents the end of a tone. Although either transition may be detected, a low-to-high transition which occurs at the end of the tone is easier to detect and is preferred. A threshold detector then applies a predetermined threshold to discriminate between true tones and noise or tone-like signals.

While the invention has been described in the context of a preferred embodiment, it will be apparent to those skilled in the art that the present invention may be modified in numerous ways and may assume many embodiments other than that specifically set out and described above. For example, different methods of practicing the block diagram of FIG. 1 are possible, including microcode running on a data processor, dedicated electronic circuitry, and combinations of the two. Furthermore, additional signal processing such as a broadband white noise discriminator may occur on INPUT DATA to change the result of the power computation. Another modification is that the series of functional steps of FIG. 1 may be performed in a sequentially different order, for example the order illustrated by the software included in APPENDIX A. Accordingly, it is intended by the appended claims to cover all modifications of the invention which fall within the true spirit and scope of the invention.

APPENDIX A

```
/* Determine prediction error:
        dot product of rx_data and atap minus newest received sample */ errsig = (double) dotm(rx_data,atap,ntaps) - (double) x;

/* Update Error-Power Indicator */ epia += errsig*errsig;

/* LMS update */ if ((sample_counter) % power_window != 0)
      for(j=(ntaps-1);j>=0;j--) atap[j] -= beta * errsig * rx_data[j];

/* Raw Rx-data shift */ for(j=14;j>0;j--) raw_data[j] = raw_data[j-1];
   raw_data[0] = (double) x;

/* Filtered Rx-data shift */ for(j=nrxdata;j>0;j--) rx_data[j] = rx_data[j-1];

/* Prefilter convolution; dot product of raw_data and prefilter */ rx_data[0] = (double) dotm(raw_data, prefilter, prefilter_length);

/* Raw-signal power-estimate update: */ raw_powera += rx_data[0]*rx_data[0];
```

```c
if ((sample_counter) % power_window == 0) { tone_flag = (((powerg+powerh+poweri+powerj) -
        (powera+powerb+powerc+powerd)
        * detect_scale_factor) < 0) ? 1 : 0;

powerj = poweri;
    poweri = powerh;
    powerh = powerg;
    powerg = powerf;
    powerf = powere;
    powere = powerd;
    powerd = powerc;
    powerc = powerb;
    powerb = powera;
    powera = 0.;

blocked = 0;

if (((raw_poweri+raw_powerj+raw_powerk+raw_powerl) -
        (raw_powera+raw_powerb+raw_powerc+raw_powerd) *
        block_scale_factor) < 0)   blocked = 1;

if (tone_flag == 0 || blocked == 1) tone_persist_counter = 0;
    else tone_persist_counter++;

if (tone_persist_counter >= tone_persist_count)
        printf ("***tone detect at %d\n", sample_counter);

raw_powerl = raw_powerk;
    raw_powerk = raw_powerj;
    raw_powerj = raw_poweri;
    raw_poweri = raw_powerh;
    raw_powerh = raw_powerg;
    raw_powerg = raw_powerf;
    raw_powerf = raw_powere;
    raw_powere = raw_powerd;
    raw_powerd = raw_powerc;
    raw_powerc = raw_powerb;
    raw_powerb = raw_powera;
    raw_powera = 0.;
```

I claim:

1. In a telecommunications system having a data processor for performing signal processing, a method of detecting a wideband tone comprising the steps of:
providing an input data signal to an input of the telecommunications system, the input data signal conducting a wideband tone occurring in a predetermined frequency range;
bandpass filtering said input data signal;
predicting a value of said bandpass filtered data signal from said input data signal;
providing an error signal as a difference between said input data signal and said predicted value;
continuously computing a power of said error signal; and
providing a tone flag signal to the data processor in response to a predetermined relationship between a first power of said error signal computed during a first interval in time and a second power of said error signal computed during a second interval in time.

2. The method of claim 1 wherein said step of providing a tone flag signal further comprises a step of providing said tone flag signal in response to a later of said first and second powers exceeding an earlier of said first and second powers by a predetermined threshold.

3. The method of claim 1 wherein said step of providing a tone flag signal further comprises a step of providing said tone flag signal in response to an earlier of said first and second powers exceeding a later of said first and second powers by a predetermined threshold.

4. The method of claim 1 wherein said step of providing a tone flag signal further comprises a step of providing said tone flag signal in response to said predetermined relationship between said first power of said error signal computed during said first interval in time and said second power of said error signal computed during said second interval in time, said first interval in time separated from said second interval in time by six sampling periods.

5. The method of claim 1 wherein said step of providing a tone flag signal further comprises a step of providing said tone flag signal in response to said predetermined relationship between said first power of said error signal computed during a first four sampling periods and said second power of said error signal computed during a second four sampling periods.

6. The method of claim 5 wherein said step of providing a tone flag signal further comprises a step of providing said tone flag signal in response to said predetermined relationship between said first power of said error signal computed during said first four sampling periods and said second power of said error signal computed during said second four sampling periods, said first four sampling periods separated from said second four sampling periods by six sampling periods.

7. The method of claim 1 wherein said step of providing a tone flag signal further comprises a step of providing said tone flag signal in response to said predetermined relationship between said first power of said error signal computed during a first sampling period and said second power of said error signal computed during a second sampling period.

8. The method of claim 1 wherein said step of providing an error signal further comprises a step of providing said error signal as said difference between said input data signal and said value of said input data signal predicted from said bandpass-filtered data signal using a least-mean-squares (LMS) adaptive linear predictor.

9. A method of detecting a wideband tone comprising the steps of:
applying an input data signal to a bandpass filter in order to produce a bandpass-filtered data signal;
supplying said bandpass-filtered data signal to a predictor in order to continuously predict a value of said input data signal from said bandpass-filtered input data signal;
providing an error signal as a difference between said input data and said continuously-predicted value of said bandpass-filtered data signal;
applying said error signal to a power computation for continuously computing a power of said error signal; and
providing a tone flag signal in response to detecting a predetermined relationship between a first power computed during a first interval in time and a second power computed during a second interval in time.

10. The method of claim 9 wherein said step of providing a tone flag signal further comprises a step of providing said tone flag signal in response to an earlier of said first and second powers exceeding a later of said first and second powers by a predetermined threshold.

11. The method of claim 9 wherein said step of providing a tone flag signal further comprises a step of providing said tone flag signal in response to a later of said first and second powers exceeding an earlier of said first and second powers by a predetermined threshold.

12. The method of claim 9 wherein said step of providing a tone flag signal further comprises a step of providing said tone flag signal in response to said predetermined relationship between said first power computed during a first four sampling periods and said second power computed during a second four sampling periods.

13. The method of claim 12 wherein said step of providing a tone flag signal further comprises a step of providing said tone flag signal in response to said predetermined relationship between said first power computed during said first four sampling periods and said second power computed during said second four sampling periods, said first four sampling periods separated in time from said second second four sampling periods by six sampling periods.

14. The method of claim 9 wherein said step of continuously predicting a value of said input data signal further comprises a step of continuously predicting said value of said input data from said bandpass-filtered input data signal using a least-mean-squares (LMS) adaptive linear predictor.

15. A method of detecting a wideband tone comprising the steps of:
applying an input data signal to a bandpass filter in order to produce a bandpass-filtered data signal;
continuously predicting a value of said input data signal from said bandpass-filtered data signal by applying said bandpass-filtered data signal to a least-mean squares (LMS) adaptive linear predictor;
providing an error signal as a difference between said input data and a corresponding predicted value of said bandpass-filtered data signal;
applying said error signal to a multiplier for adjusting said LMS adaptive linear predictor in proportion to said error signal;

applying said error signal to a power computation for continuously computing a power of said error signal;

providing a lowpass filter;

coupling said continuously-computed power of said error signal to said lowpass filter for averaging said continuously-computed power over a predetermined interval to provide a first power;

delaying said first power to provide a second power; and providing a tone flag signal in response to detecting a predetermined transition between said first power and said second power exceeding a predetermined threshold.

16. The method of claim 15 wherein said step of continuously predicting a value of said input data signal further comprises the steps of:

sequentially delaying said bandpass-filtered data signal;

multiplying said delayed bandpass-filtered data signal in a predetermined number of corresponding variable multipliers;

summing outputs of said variable multipliers;

providing a substractor;

coupling said outputs of said variable multipliers to said substractor for providing an error signal as a difference between said input data and said summed outputs of said variable multipliers; and multiplying said error signal by a predetermined adaptive coefficient to provide said variable multiplier for each of said predetermined number of iterations.

17. The method of claim 15 wherein said step of bandpass filtering input data signal further comprises bandpass filtering said input data signal sampled from an input signal during a sampling period.

18. A wideband tone detector, comprising:

a bandpass filter for receiving an input data signal and in response providing a bandpass-filtered data signal;

an adaptive linear predictor coupled to said bandpass filter for receiving said input data signal and said bandpass-filtered data signal and for predicting a value of said bandpass filtered data signal from said input data signal;

said adaptive linear predictor providing an error signal as a difference between said input data signal and said predicted data signal;

a power computation coupled to said adaptive linear predictor for receiving said error signal and providing a continuously computed power of said error signal; and a tone flag signal generator coupled to said power computation for receiving said continuously computed power of said error signal and detecting a predetermined relationship between a first power of said error signal computed during a first interval in time and a second power of said error signal computed during a second interval in time and in response providing a tone flag signal.

19. The wideband tone detector of claim 18, wherein said tone flag signal generator further comprises:

a lowpass filter coupled to said power computation for averaging said continuously computed power of said error signal over a predetermined interval to provide a first power;

a predetermined delay coupled to said lowpass filter for delaying said first power for a predetermined interval to provide a second power; and a threshold detector for receiving said first and second powers and for detecting a predetermined transition between said first power and said second power exceeding a predetermined threshold.

* * * * *